(12) United States Patent
Kusase et al.

(10) Patent No.: US 7,265,463 B2
(45) Date of Patent: Sep. 4, 2007

(54) ROTARY ELECTRIC APPARATUS WITH HIGH COOLING PERFORMANCE

(75) Inventors: Sin Kusase, Oobu (JP); Takuzou Mukai, Handa (JP); Kazushige Okumoto, Kariya (JP)

(73) Assignee: Denso Corporation, Kariya (JP)

( * ) Notice: Subject to any disclaimer, the term of this patent is extended or adjusted under 35 U.S.C. 154(b) by 215 days.

(21) Appl. No.: 10/949,296

(22) Filed: Sep. 27, 2004

(65) Prior Publication Data

US 2005/0104460 A1 May 19, 2005

(30) Foreign Application Priority Data

Sep. 26, 2003 (JP) ............... 2003-334533

(51) Int. Cl.
*H02K 9/00* (2006.01)
*H02K 9/06* (2006.01)

(52) U.S. Cl. ............... 310/62; 322/24; 322/28; 322/25; 322/27; 322/59; 310/63; 310/59; 310/58

(58) Field of Classification Search ............... 310/68 D
See application file for complete search history.

(56) References Cited

U.S. PATENT DOCUMENTS

| | | | | |
|---|---|---|---|---|
| 3,666,978 A | * | 5/1972 | Renner | ............ 310/62 |
| 4,469,966 A | | 9/1984 | Iwaki et al. | |
| 4,870,307 A | | 9/1989 | Kitamura et al. | |
| 5,095,235 A | * | 3/1992 | Kitamura | ............ 310/68 D |
| 5,483,111 A | * | 1/1996 | Kuznetsov | ............ 310/12 |
| 5,957,663 A | * | 9/1999 | Van Houten et al. | ......... 417/13 |
| 6,028,379 A | * | 2/2000 | Bertolini et al. | ............ 310/51 |
| 6,278,248 B1 | * | 8/2001 | Hong et al. | ............ 318/254 |
| 6,828,703 B2 | * | 12/2004 | Einheuser et al. | ......... 310/68 D |
| 2003/0141854 A1 | * | 7/2003 | Kuribayashi et al. | ......... 322/28 |
| 2005/0104460 A1 | * | 5/2005 | Kusase et al. | ............ 310/63 |
| 2005/0194850 A1 | * | 9/2005 | Bradfield et al. | ......... 310/68 D |
| 2006/0006655 A1 | * | 1/2006 | Kanazawa et al. | ......... 290/40 B |
| 2006/0267344 A1 | * | 11/2006 | Kuribayashi et al. | ......... 290/31 |

FOREIGN PATENT DOCUMENTS

| | | | |
|---|---|---|---|
| DE | 3823447 A1 | * | 1/1990 |
| DE | 19734816 A1 | * | 2/1999 |
| JP | A-58-075439 | | 5/1983 |
| JP | 59141796 A | * | 8/1984 |

(Continued)

OTHER PUBLICATIONS

Japanese Office Action with English-language Translation, Mar. 13, 2007, pp. 1-5.

*Primary Examiner*—Karl Tamai
*Assistant Examiner*—Ondria Garner
(74) *Attorney, Agent, or Firm*—Oliff & Berridge, PLC (57) ABSTRACT

A rotary electric apparatus, such as on-vehicle three-phase AC generator (i.e., alternator) comprises a main rotary unit, a semiconductor power converter, and an air cooling mechanism. The main rotary unit is provided with a rotor and an armature disposed as a stator around the armature. The armature has armature windings wound therearound. The semiconductor power converter is disposed together with the main rotary unit. The air cooling mechanism cools down the semiconductor power converter. This mechanism comprises a fan motor driven in response to an AC (alternating current) excitation by current coming from the armature windings.

17 Claims, 8 Drawing Sheets

FOREIGN PATENT DOCUMENTS

| | | |
|---|---|---|
| JP | A-63-257435 | 10/1988 |
| JP | A 05-219685 | 8/1993 |
| JP | A 08-084471 | 3/1996 |
| JP | A-2000-032711 | 1/2000 |
| JP | A-2000-032720 | 1/2000 |
| JP | 2002315284 A * | 10/2002 |

* cited by examiner

ROTARY ELECTRIC APPARATUS WITH HIGH COOLING PERFORMANCE

CROSS REFERENCES TO RELATED APPLICATIONS

The present application relates to and incorporates by reference Japanese Patent application No. 2003-334533 filed on Sep. 26, 2003.

BACKGROUND OF THE INVENTION

1. Technical Field

The present invention relates to a rotary electric apparatus such as on-vehicle alternator, and in particular, to a rotary electric apparatus in which one or more power electronic devices are cooled down with efficiency.

2. Related Art

It is usual that vehicles are equipped with a variety of rotary electric apparatuses such as alternator. Such rotary electric apparatuses adopt semiconductor devices that are vulnerable to heat, which can be seen as IC control devices and power electronic devices such as converter-inverters (semiconductor power converters).

Pursuing more-compact and higher-output rotary electric apparatuses will surely lead to a situation where the temperature to be generated due to heating of the semiconductor devices rises higher. To resolve such a difficulty, it is significant to improve cooling performance for the semiconductor devices.

General cooling techniques which can be adopted by the rotary electric apparatuses include a water cooling technique. This water cooling technique is able to provide a relatively high cooling performance, while the size of a cooling structure for realizing the technique can be made relatively smaller. Such an advantage is however balanced out, because the water cooling technique requires that a considerably large-scale additional device including a piping network be installed therein. This will lead to a rise in manufacturing cost, space occupied by a rotary electric apparatus, and weight of the apparatus. In addition, as is obvious, the water should be reserved at any time, whereby a complex-configured system for reserving the water is needed. Such an additional installment lowers reliability of the entire system in various factors including arrangement of pipes, connections thereof, and fitting the pipes against vibration.

There are other drawbacks as to the water cooling technique. When the semiconductor devices are cooled down by water, it is required to additionally adopt a heat-conductive cooling structure electrically isolated from the cooling medium (water). This adoption will increase transitional thermal resistance. Accordingly, larger fluctuations of thermal load cause an overshoot in the temperature rise, giving rise to a problem that the semiconductor devices may cause thermal deviation. It can therefore be concluded that, though requiring a relatively large-scale and high-cost configuration, the water cooling technique is unable to provide higher cooling performance. There is also another drawback that the water cooling type is lower in the transitional cooling characteristic than an air cooling type of mechanism, which will then be described.

As a first type of air cooling mechanism whose transitional cooling characteristic is higher is proposed by Japanese Patent Laid-open publication No. 5-219685, in which air ducts are piped to intake cool air from a cool air apace in which there is relatively lower temperature air, such as fresh air, and an electric fan is placed in the air ducts. The electric fan is placed to hold or amplify an amount of cooling air so that the loss of air resulting from resistance on the ducts to the flowing air is maintained even at lower-speed revolutions of a vehicle.

A second type of air cooling mechanism is also proposed by Japanese Patent Laid-open publication No. 8-84471. In the proposal, it is first noted that the control of the electric fan at lower-speed revolutions involves a temperature sensor and a speed controller, and then a practical resolution to such a situation is provided. The practical resolution is a technique of connecting a motor to a filed winding DC-exited to control power to be generated.

For the foregoing two types of air cooling mechanisms, it can be expected to have an effect as high as the water cooling type in improving the cooling performance. However, there are still some difficulties to be solved concerning the foregoing two types of air cooling systems. The first one requires that an electric motor for larger ducts and a larger-scale fan be installed, while the second one requires to have a temperature sensing circuit, an activation determining circuit operating based on a sensed temperature outputted from the sensing circuit, and a motor drive/control circuit which is usually high-cost and complex in its configuration. In this way, though a cooling performance as high as that provided by the water cooling type may be obtained, there still remain the problems deformed from the problems that the water cooling type has faced.

SUMMARY OF THE INVENTION

The present invention has been made with due consideration to the foregoing problems, and an object of the present invention is to provide a compact, excellent cooling performance, high reliability, and high-output rotary electric apparatus that adopts a power converter and that can be used under operating conditions in which loads fluctuate largely.

In order to accomplish the foregoing object, as one aspect of the present invention, there is provided a rotary electric apparatus such as on-vehicle three-phase AC generator (i.e., alternator). This apparatus comprises a main rotary unit, a semiconductor power converter, and an air cooling mechanism. The main rotary unit is provided with a rotor and an armature disposed as a stator around the rotor. The armature has an armature winding. The semiconductor power converter is disposed together with the main rotary unit. The air cooling mechanism cools down the semiconductor power converter. This mechanism comprises a fan motor driven in response to an AC (alternating current) excitation by current from the armature winding.

Accordingly, it is unnecessary to mount, to the air cooling mechanism, an inverter for driving the motor fan and a gate drive controller for the inverter. The rotary electric apparatus can therefore be made compact (space-saving) and manufactured at low cost and with reliability. The rotary electric apparatus according to the present invention is applicable to various semiconductor devices other than the semiconductor power converter.

Preferably, the armature winding of the armature of the main rotary unit is larger in the number of poles than an armature winding of the fan motor. In this case, the number of revolutions of the fan motor is asynchronous, at least in part, with the number of revolutions of the main rotary unit.

Still preferably, the fan motor is disposed close to a radiator of the semiconductor power converter and is connected to a fin unit substantially covering an overall surface of the radiator.

It is also preferred that the fan motor is provided with a resin-made casing also serving as a cover containing the semiconductor power converter therein. Thus, the casing can be prepared as various independent parts in advance so as to be adaptable to the fan motors of various types, and the casing best appropriate for a fan motor to be used is selected and assembled with the fan motor which is best suitable for the environmental conditions in which the apparatus is placed.

For example, the armature winding of the main rotary unit is electrically connected to the armature winding of the fan motor by elastically supported contact portions. Electrical connections of wirings can therefore be realized within the contact portions when the casing is assembled with the main rotary unit. There are no exposure of wirings and connecting members.

The casing may be integrated with a ventilating duct opening toward the fan motor. This structure is effective in preventing water, dusts, and/or pebbles from being sucked into the casing, thus increasing reliability of the apparatus.

It is also preferred that a current control element is placed between the armature winding of the main rotary unit and the armature winding of the fan motor and means for controlling current passing through the current control element such that an amount of AC excitation to the fan motor is controlled. In such a case, preferably, the controlling means comprises a three-phase bridge rectifier consisting of diodes and a current control circuit including the current control element connected to both positive and negative terminals of the three-phase bridge rectifier.

It is also preferred that the armature of the main rotary unit and the semiconductor power converter are contained in different cases and the fan motor is secured together with the case in which the semiconductor power converter is contained.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENTS

Referring to the accompanying drawings, preferred embodiments of the present invention will now be described.

First Embodiment

Figure 1:
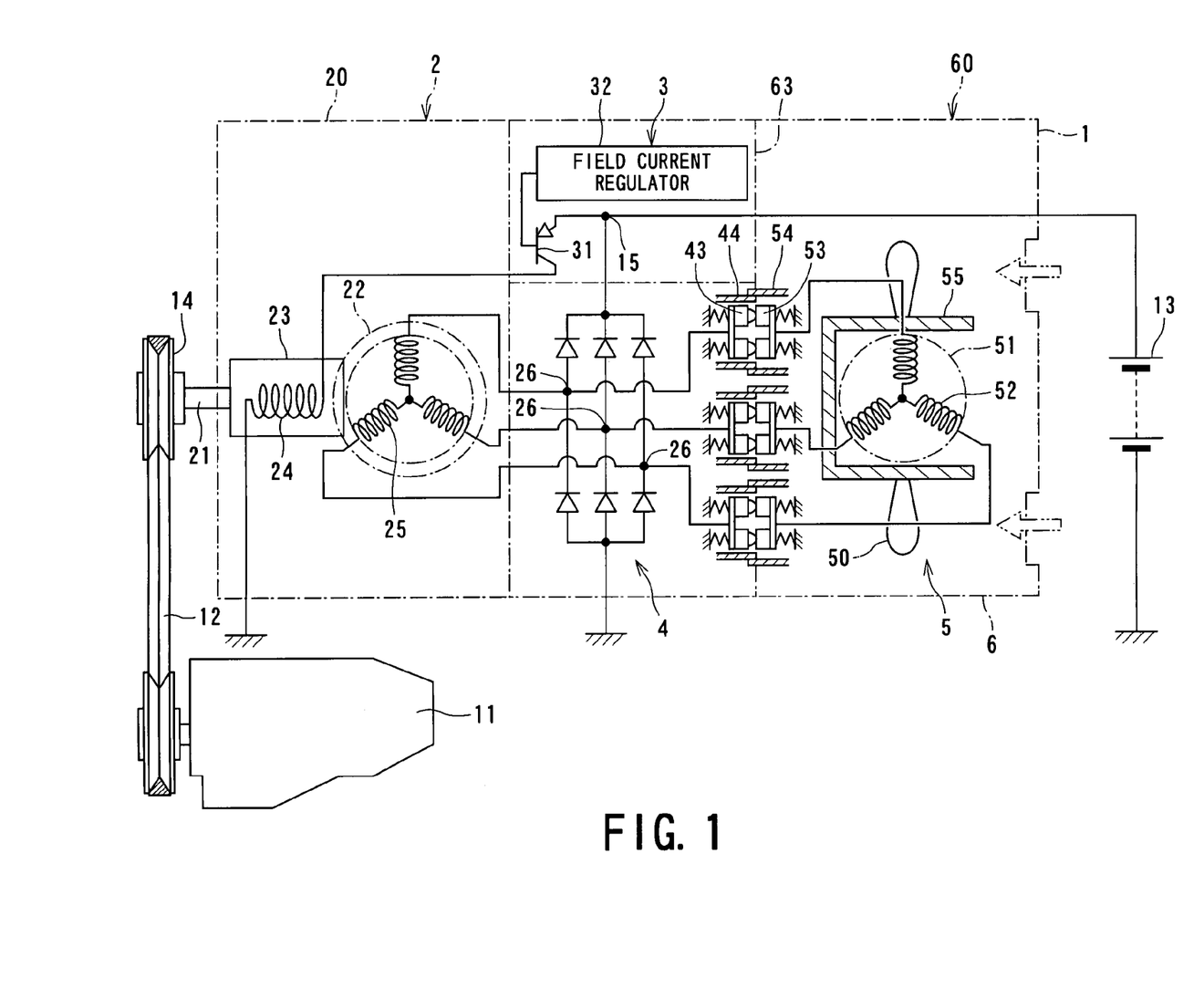
FIG. 1 is a circuit diagram showing an on-vehicle three-phase AC generator (alternator) serving as the rotary electric apparatus according to a first embodiment of the present invention.
Figure 2:
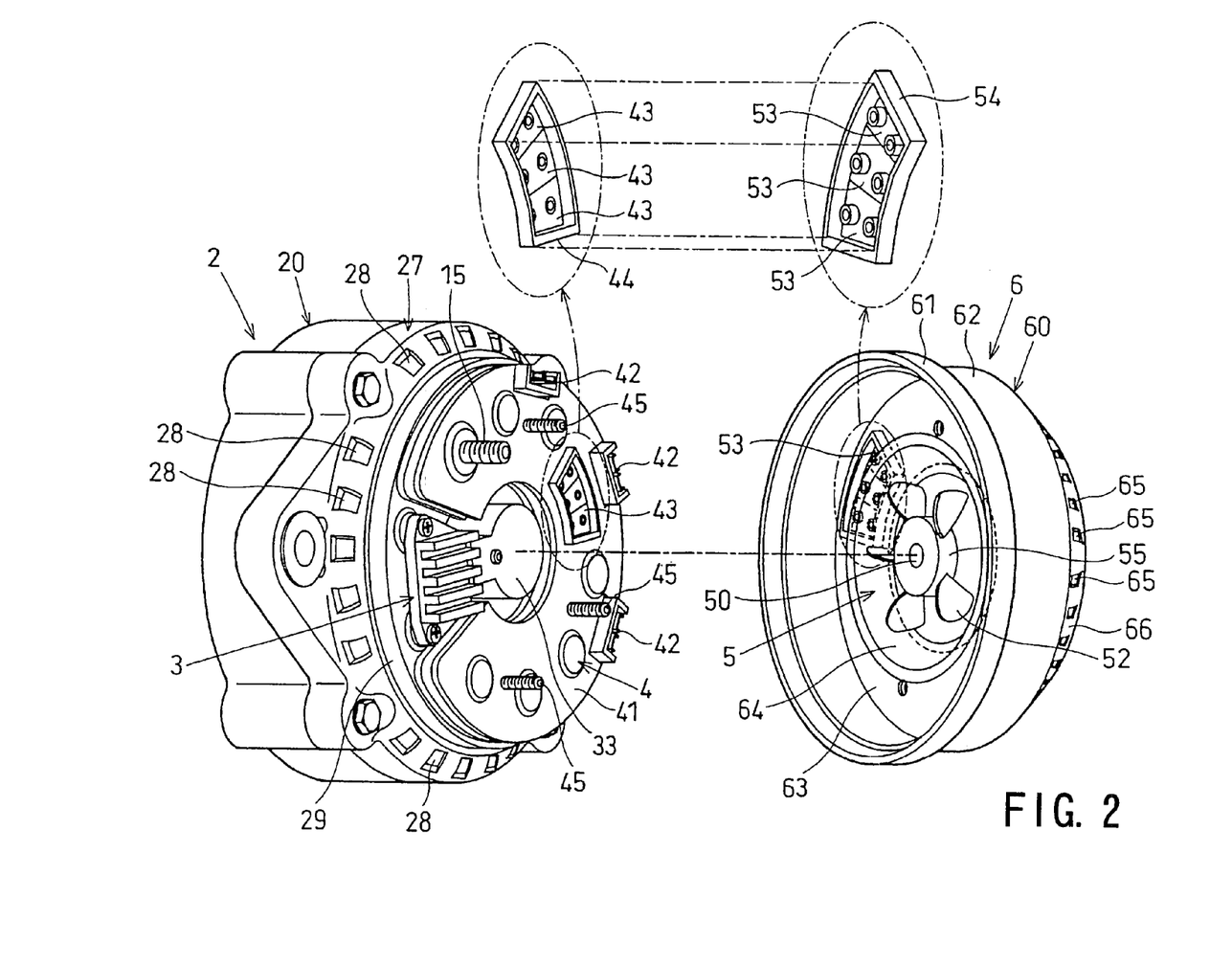
FIG. 2 is a perspective view of both a main rotary unit and an air cooling mechanism (which are combined with each other) in the alternator of the first embodiment.
Figure 3:
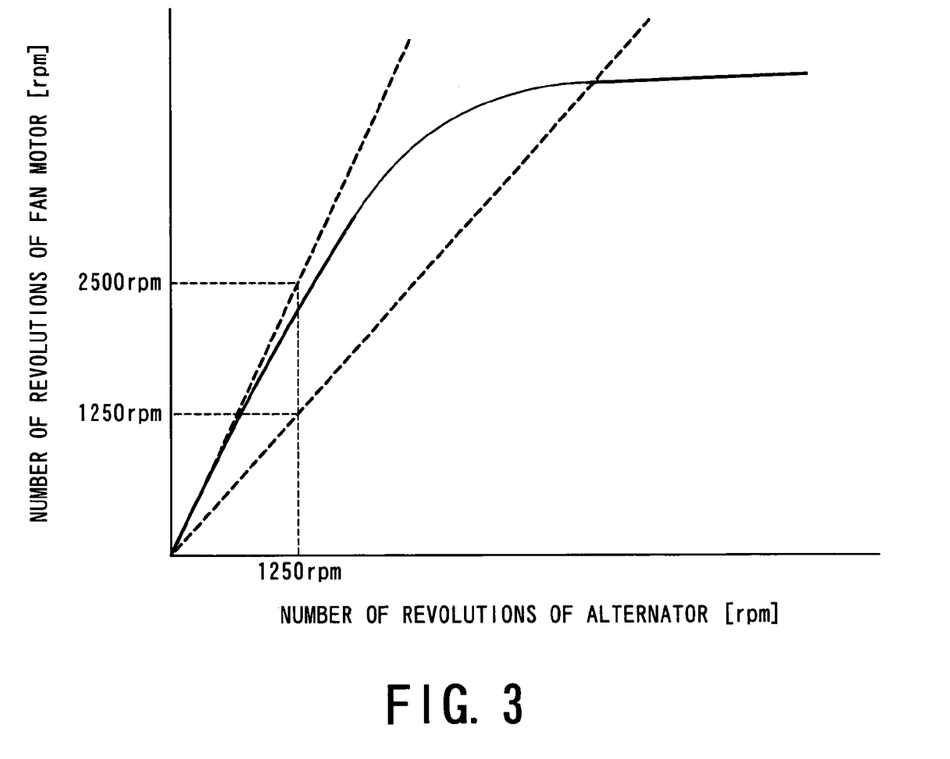
FIG. 3 is a graph explaining the operation of a fan motor incorporated in the alternator of the first embodiment.

Referring to FIGS. 1 to 3, a first embodiment of the rotary electric apparatus according to the present embodiment will now be described.

FIG. 1 shows an outlined configuration of an on-vehicle three-phase alternating current generator 1 (i.e., alternator) that is adopted as the rotary electric apparatus according to the first embodiment.

In the present embodiment, the alternator 1 is formed to have an outer diameter of nearly 126 mm and an output rating of 14V-250 A and is driven by a vehicle engine 11 via a belt 12. The engine 11 serves as drive means for the alternator 1. The alternator 1 is configured to not merely charge an on-vehicle battery 13 but also power a variety of on-vehicle electric appliances. The components of the alternator 1 include a main rotary unit 2, regulator 3, rectifying circuit 4 (three-bridge rectifier) converting three-phase alternating current to direct current, and air cooling mechanism 6 provided with an AC excitation type of fan motor 5 to which the present invention is applied.

The main rotary unit 2, which is placed in a housing 20, is equipped with a rotary shaft 21, a layered type of armature core (composing a stator core) 22 coaxially disposed around an outer circumference of the rotary shaft 21, and a field rotor (composing a rotor) 23. On a frontal end of the rotary shaft 21 (i.e. leftward end in FIG. 1), a pulley 14 driven by the engine 11 through the belt 12 is secured. The field rotor 23 is disposed within the armature core 22 to be linked with the rotary shaft 21. In addition, the field rotor 23 has sixteen unguiform magnetic poles (pole cores) formed along the outer circumference thereof and a field winding (field coil) 24 in a central part thereof, whereby the field rotor 23 is formed into a Randell type of field rotor.

The field winding 24 has two ends. Of these, one end is connected to an output terminal 15 of the alternator 1 via a switching transistor 31 for the regulator 3. The alternator 1 is connected with the battery 13. The other end is connected to the ground, as shown in FIG. 1. To a base of the switching transistor 31, a field current regulator 32 is connected. This regulator 32 has a configuration of comparing a terminal voltage of the battery 13 to a predetermined appropriate level for controlling a conduction factor of the transistor 31. Practically, depending on the battery voltage lower or higher than the predetermined level, the conduction factor is raised or lowered, respectively.

On an inner circumference of the armature core 22, forty-eight slots are formed in an axial direction. Armature windings 25 for the main rotary unit 2, which are three-phase windings wound at pitches of 16-pole full-pitch windings, are fixedly contained in those slots. The armature windings 25 have three-phase terminals 26, which are connected to the positive terminal of the battery 13 placed outside the rotary electric apparatus through the rectifying circuit 4 performing three-phase rectification. The rectifying circuit 4 is formed of a three-phase bridge circuit consisting of six diodes.

FIG. 2 shows a joint structure between a rear end frame 27 and an air cooling mechanism 6 jointed with the rear end frame 27, the rear end frame 27 composing a rear end (i.e., the right end in FIG. 2) of a cylindrical housing 20 of the main rotary unit 2. A large number of air holes 28 are formed along an outer circumferential circle on the rear end frame 27 and a cooling fin (i.e., heatsink) 41 is concentrically secured on a rear end surface of the rear end frame 27. The cooling fin 41 is made into a circular disk with a notch (that is, forming into an approximate Ω-letter shape) and holds six silicone diodes composing the rectifying circuit 4 (three-phase rectifier).

Furthermore, various components including armature windings 25 and a filed rotor 23 (refer to FIG. 1) are accommodated within the housing 20. In the central part of the rear end surface of the housing 20, a brush holder 33 for a slip ring is mounted to protrude rearward. The regulator 3 is jointed to the notch of the cooling fin 41.

The three-phase terminals 26 taken from the armature windings 25 are linked with three terminal connectors 42 fixed on an outer circumferential end portion of the cooling fin 41 at angular intervals. The terminals of each terminal connector 42 are covered by an insulation resin layer arranged beneath the cooling fin 41 for the rectifying circuit 4.

Moreover, on the cooling fin 41 are provided three elastically supported contact portions 43 which are adjoining to each other in a fan form. To the three elastically supported contact portions 43, winding ends of the three-phase terminals 26 of the armature windings 25 are connected. In the present embodiment, the elastically supported contact portions 43 are secured on the cooling fin 43 and surrounded by an insulative fence member 44 of a given height.

On the other hand, the cooling mechanism 6, which is contained in a cylindrical casing 60 to be coupled with the rear end frame 27 so as to serve as a rear cover, is provided with an electric fan motor 5 concentrically disposed on an inner side surface of the casing 60. The fan motor 5 is excited by AC currents passing through the armature windings 25 of the main rotary unit 2.

The casing 60, which is a support for the fan motor 5, is produced by integrally molding a nylon resin with 30% fiber glass. As shown in FIG. 2, the casing 60 includes a fitting fringe 61 and a cylindrical cover 62. The fitting fringe 61 can be fitted with the outer face of a fitting circumferential step 29 formed on a circumferential outer edge portion of the rear end frame 27. The cylindrical cover 62 is formed to contact the periphery of the cooling fin 41 so that the cooling fin 41 is covered therein.

The cylindrical cover 62 includes a frontal wall 63 positioned on the rear side of the cover 62 and a ventilating duct 64 for the fan motor 5 is integrally formed in a central part of the frontal wall 63. The fan motor 5 is mounted to be concentric with the cover 62 and protrudes frontward. The cylindrical cover 62 is bottomed by a rear-side wall 66 through which a large number of air holes 65 are formed.

As illustrated in FIG. 1, the fan motor 5 is provided with a motor armature 51 and a fin unit 50 formed of the same material as the casing 60 and arranged in a concentric manner within a ventilating duct 64. The motor armature 51 has armature windings 52, of which ends are wired to three elastically supported contact portions 53 which are adjoining to each other in a fan form on the front-side wall 63 of the casing 60. The elastically supported contact portions 53 are surrounded by a fan-like insulative fence member 54 of a given height, which has a slightly larger size than the foregoing fan-like insulative fence member 44 on the cooling fin 41 and allows the member 54 to be fitted with the fence member 44, as shown in FIG. 1.

On the rear end surface of the rear end frame 27, three bolts 45 are secured so as to run through the cooling fin 41 so that the cooling fin 41 is positioned to the casing 60 of the cooling mechanism 6 and a linkage is established between the cooling fin 41 and the casing 60. Hence, when the casing 60 is assembled with the housing 20, the fin unit 50 is located closer to the cooling fin 41 and the three elastically supported contact portions 53 are brought into contact with three elastically supported contact portions 43 to establish elastic connections therebetween without using any other means, thus securing respective electric conductions between the contact portions of each pair.

The fin unit 50 is closely connected to an abducent cage rotor 55 located in a radially central part of the fin unit 50. The cage rotor 55 composes part of the fan motor 5. As the fan motor 5 has a laminated core through which 35 small-size slots are formed in its axial direction, the cage rotor 55 is formed by die-cast-molding the laminated core. The fan motor 5 also has the motor armature 51, as described before, which is located in a bore of the cage rotor 55. The motor armature 51 has 24 slots formed in its axial direction, along which three-phase windings are formed at pitches of 8-pole full-pitch windings. The motor armature 51 is secured on the casing 60 in a condition where there is kept a gap of nearly 0.3 mm between the cage rotor 55 and the motor armature 51.

Since the armature windings 52 of the motor armature 51 are thin in diameter and wound a plurality of turns, the resistance of the armature windings 52 is as high as approximately 15 Ω. By contrast, the armature winding 23 of the main rotary unit 2 has a limited winding resistance of nearly 10 mΩ.

The operations of the on-vehicle alternator 1 according to the present embodiment will now be described.

Driving the engine 11 causes the field rotor 23 to be driven, and then causes the switching transistor 31 to be conductive initially. In response to this initial conduction, the field rotor 23 is excited to allow its 16 poles to become magnetized in an alternating N/S manner, resulting in generating three-phase power across the armature windings 25. The generated three-phase power is rectified into DC power by the rectifying circuit (three-phase bridge rectifier) 4, whereby the rectified DC power is sent to the battery 13, in which part of the DC power is consumed for the excitation of the field windings 24. The three-phase power is also given to the armature windings 52 of the fan motor 5, which is connected in parallel to the rectifying circuit 4. Thus the armature windings 52 are also excited to cause a rotating magnetic filed in the fan motor 5.

The rotating field causes the cage rotor 55 to be driven in the fan motor 5, whereby the fin unit 50 (i.e., fins) is revolved. This revolution of the fin unit 50 sucks in air through the air holes 65 of the casing 60, thus providing cooling air. The cooling air blows out forward via the passage of the ventilating duct 64, so that the blown-out air directly impinges onto the cooling fin 41 in the form of turbulent and eddy flow. Accordingly, the rectifying circuit 4 is cooled down at a high heat exchanger effectiveness. The air that has undergone the cooling operation is then discharged outward through the air holes 28 of the rear end frame 27.

Both of the number of poles of the main rotary unit 2 and that of the fan motor 5 create a synchronized speed defined by a rate 2 (=16/8). Thus, when the rotary electric apparatus 1 operates in a condition of low speeds and reduced loads, the number of revolutions of the fan motor 5 is roughly two times larger than the field rotor 2 of the main rotary unit 2.

It is therefore possible that, even in a lower-speed revolution range of the rotary electric apparatus 1, a great amount of cooling air can be obtained to provide a high cooling performance for the cooling fin 41, that is, for the rectifying circuit 4. In contrast, when the revolution speed of the apparatus 1 is gradually raised and brought into a higher-speed revolution range thereof, the load to the fin unit 50 becomes larger by degrees. Responsively, the revolution speed of the fin unit 50 deviates from the synchronized speed little by little, which is characteristic of the cage rotor 55 serving as a synchronized device. Therefore, making the revolution speed of the cage rotor 55 follow to the frequency (the number of revolutions) of the armature windings 25 is no longer difficult. In other words, the fan motor 5 operates in an asynchronous condition in at least part (a high speed range) of the revolution speed range.

As a result of the above asynchronous operation, the number of revolutions of the fan motor 5 exhibits a curve shown in FIG. 3, in which the curve indicative of the number of revolutions of both the fan motor 5 and the main rotary unit 2 becomes saturated in a given speed range (a range whose revolution speed of the alternator 1 is roughly above 2500 rpm), thus depicting a non-linear curve.

Hence, without controlling the fan motor 5 in a particular mode, the fin unit 50 can be driven at high revolution speeds, even the engine 11 operates at lower revolution speeds (i.e., a speed range whose revolution speed is less than 2500 rpm). In cases where the engine 11 enters its high revolution speed range (corresponding to a revolution speed range of the alternator 1, of which lower limit is nearly 2500 rpm), the number of revolutions of the fan motor 5 can be suppressed with no particular control from outside the engine 1.

The casing 60 is jointed to the housing 20 with the use of the three bolts 45 disposed to protrude from the end surface of the housing 20. In this joint operation, the elastically supported contact portions 53 on the casing 60 are positioned to face those 43 on the casing 20 and both the elastically supported contact portions 53 and 43 are pressed from one to the other to be held using the mutual elastic forces.

In addition, the insulative fence members 44 and 54 attached to both the elastically supported contact portions 43 and 53, which are also directly combined with each other in this joint operation, enclose both the contact portions 43 and 53 in a water-tight manner. Hence the fence members 44 and 45 are able to avoid water and dusts from being penetrated from the outside.

Within both the elastically supported contact portions 43 and 53, electric connections of electrode members can be established with no wiring and connection members exposed outside, thereby raising reliability of the electric connections.

Moreover, the structured described above makes it possible that both the fan motor 5 and the rectifying circuit 4 are disposed closely to each other, which causes the turbulent flow created with great force by the fin unit 50 to directly hit the cooling fin 41. This is able to enhance the heat exchange to a great extent.

In the case of the conventional on-vehicle generator, to realize an output rating of 14V-250 A, it is normally required that the generator be manufactured to have a physical size as large as 150 mm in diameter by 160 mm in overall length. If an external fan motor is attached to this conventional generator, the cost for manufacturing the generator will increase about 10 percents.

In contradiction to the conventional, in the rotary electric apparatus according to the present embodiment in which the present invention is reduced into practice, the alternator 1 is able to provide the same output rating 14V-250 A, while the physical size of the alternator 1 is still kept at a smaller volume of 126 mm in diameter by 130 mm in overall length. The cost for manufacturing the alternator 1 is limited to an increase of nearly 3 percents, which is extremely advantageous over the conventional one. Thus it is possible to provide a compact, lower-manufacturing-cost air cooling type of rotary electric apparatus having an up-graded cooling performance, while still maintaining a high output and a high reliability. These various advantages are useful for putting the rotary electric apparatus to practical use.

Second Embodiment

Figure 4:
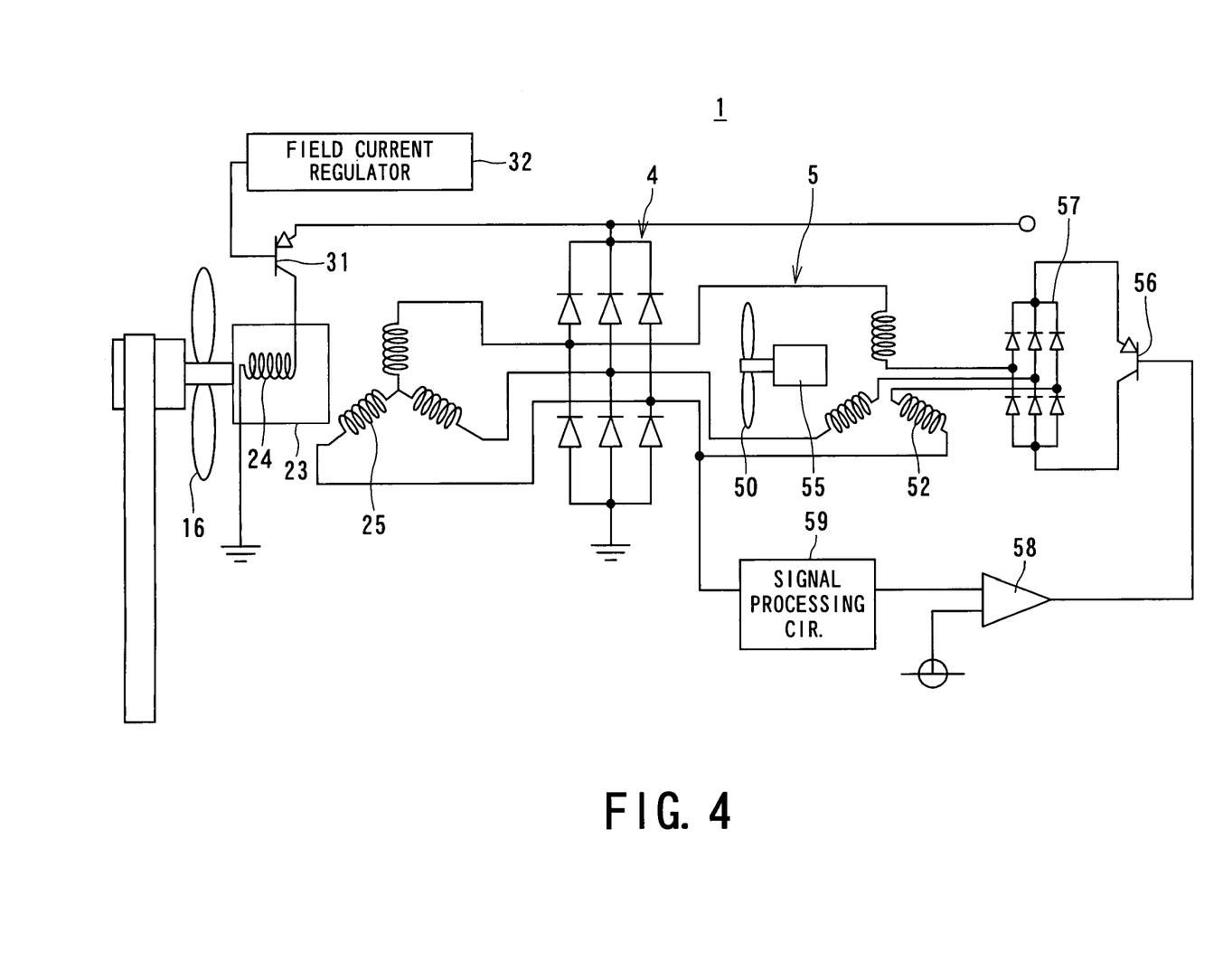
FIG. 4 is a circuit diagram showing an on-vehicle three-phase AC generator (alternator) serving as the rotary electric apparatus according to a second embodiment of the present invention.
Figure 5:
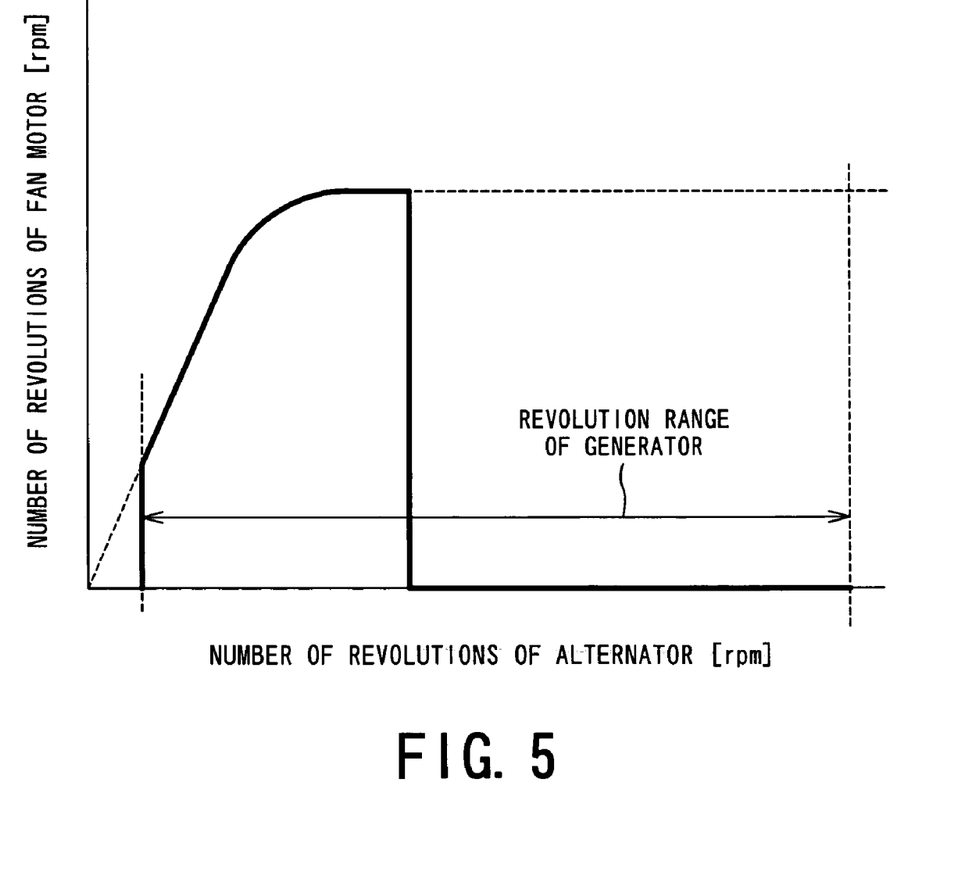
FIG. 5 is a graph explaining the operation of a fan motor incorporated in the alternator of the second embodiment.

Referring to FIGS. 4 to 5, a second embodiment of the rotary electric apparatus according to the present invention will now be described. In the second embodiment and subsequent embodiments, the components similar or equivalent to the foregoing will now be explained with the same reference numbers as those of the first embodiment.

The alternator 1 (i.e., rotary electric apparatus) according to the second embodiment adopts an armature cooling fan 16 to cool down the armature windings 25. The armature cooling fan 16 is disposed in front of the field rotor 23 (that is, on the left side end in FIG. 4). Differently from this fan 16, the alternator 1 is also provided with the fan motor 5 for cooling down the rectifying circuit 4 in the same way as the forgoing embodiment.

The armature windings 25 of the main rotary unit 2 are wound in the form of 16-pole windings, whilst the motor armature 51 of the fan motor 5 is equipped with 4-pole windings. The armature windings 25 are connected to the fan motor 5 via a three-phase bridge rectifier 57 (composed of six diodes) and a current control element 56 (consisting of one transistor), positive and negative terminals of the three-phase bridge rectifier 57 being connected to the current control element 56.

The single current control element 56 is in charge of switching the simplex directional current flow. The current control element 56 is composed of a transistor whose base is connected to an output terminal of a comparator 58. Currents depending on the number of rotations of the engine appear at one of inner points connecting respective paired diodes in the rectifying circuit 4, which are generated by one (one phase) of the armature windings 25. The currents appearing at the one inner point are given to a signal processing circuit 59, where the currents are processed into a corresponding analog voltage. The resultant voltage, which therefore depends on the number of rotations of the engine, is given to the comparator 58.

A predetermined value (threshold) is also given to the comparator 58, so that a comparison carried out by the comparator 58 permits a frequency of the currents flowing the armature windings 25 to be detected. Thus when the frequency is over the given value, the base of the current control element 56 is driven so that the element 56 is turned off. Namely, in a lower revolution speed range of the alternator 1, the fan motor 5 is subjected to the AC excitation, while in a higher revolution speed range, such an excitation on current flow is stopped due to an off-state of the current control element 56.

Therefore, as described before, a ratio between the number of poles of the main rotary unit 2 and that of the motor fan 5 (i.e., a ratio between synchronized speeds), that is, a speed increasing ratio of the field rotor 23 to the fan motor 5, can be made as high as nearly 4 times. During the main rotary unit 2 operates at higher speeds, the cooling fin 41 is cooled down sufficiently by the ventilated air. Therefore, there will occur no problem that the rectifying unit 4 overheats, even when the current to be supplied to the fan motor 5 is shut down.

More concretely, the field rotor 23 to the armature windings 25 of the main rotary unit 2 operates at a lower revolution speed, the fan motor 5 can be revolved at very high speeds. When the engine 11 increases its revolution speed such that the field rotor 23 follows it to increase its revolution speed up to the predetermined threshold, the excitation to the motor armature 51 of the fan motor 5 is shut down automatically. This automatic shut-down control is performed thanks to detecting the current frequency generated by the armature, as described above. The fan motor 5 is avoided from rotating excessively in a steady manner. It is therefore possible to noticeably raise the speed in a lower revolution speed range, whereby the fin unit 50 is entitled to enhance its own cooling capability and the air cooling mechanism 6 can be made more compact, with less space occupied.

Third Embodiment

Figure 6:
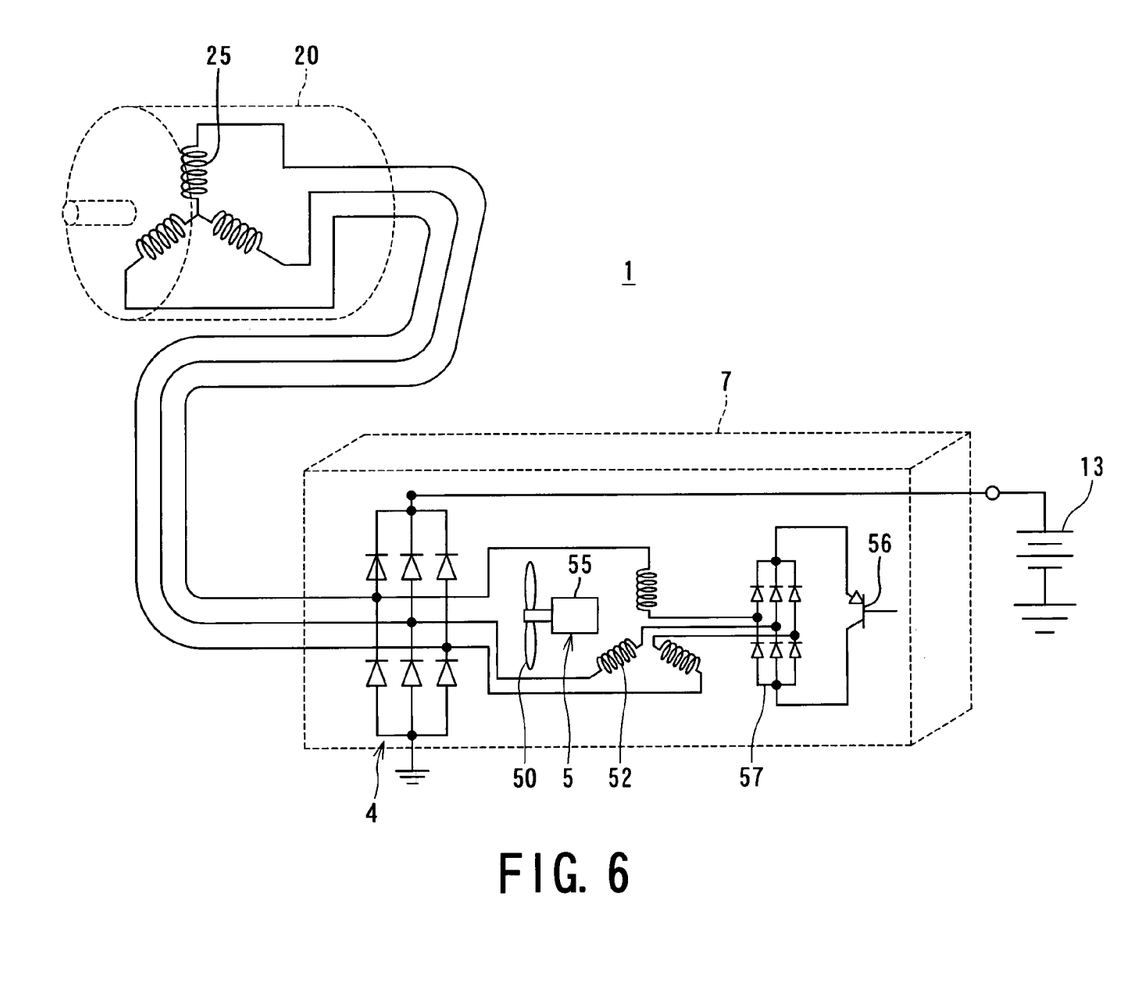
FIG. 6 outlines the configuration of an on-vehicle three-phase AC generator (alternator) serving as the rotary electric apparatus according to a third embodiment of the present invention.
Figure 7:
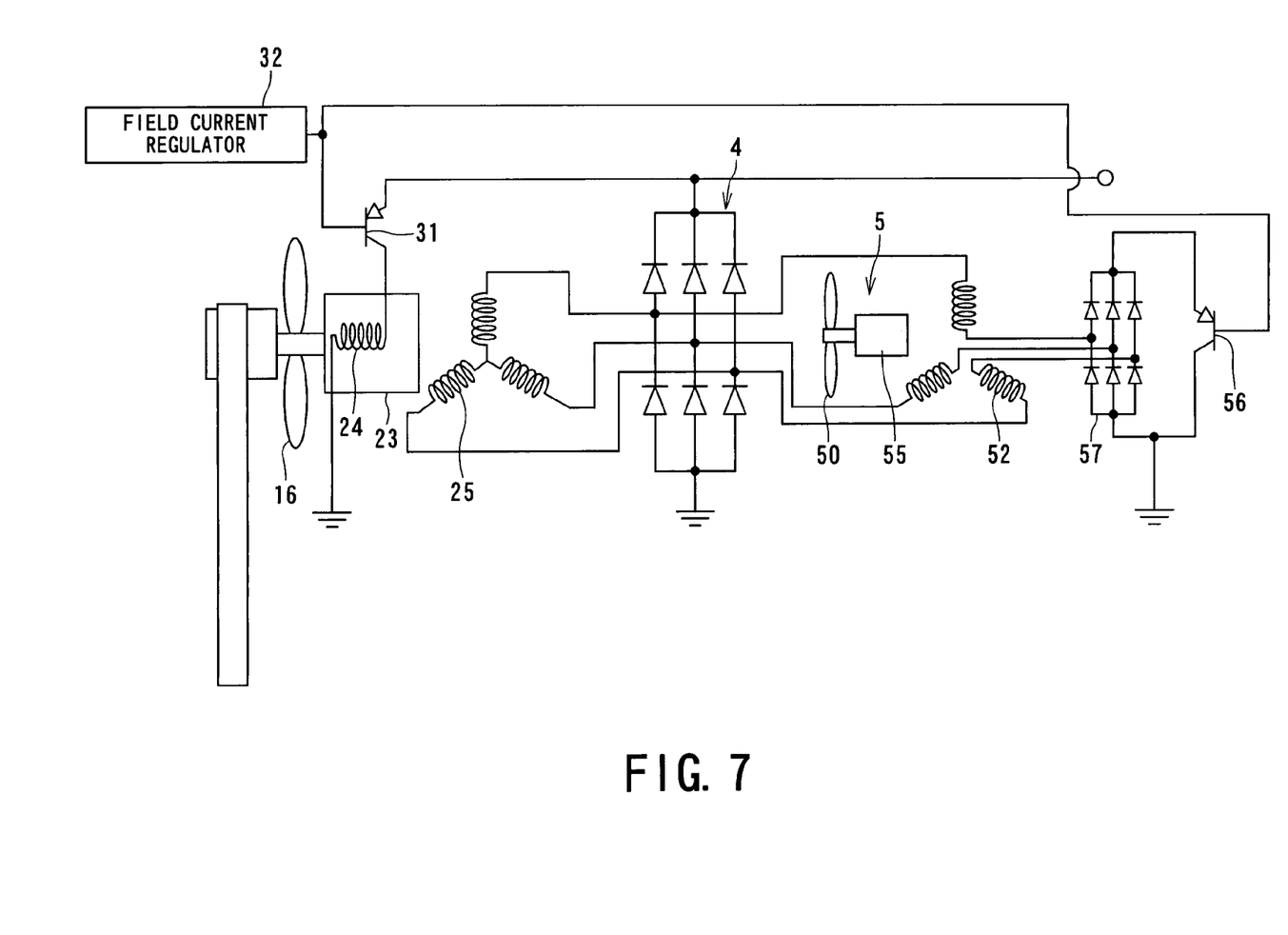
FIG. 7 is a circuit diagram showing the generator (alternator) in the third embodiment.
Figure 8:
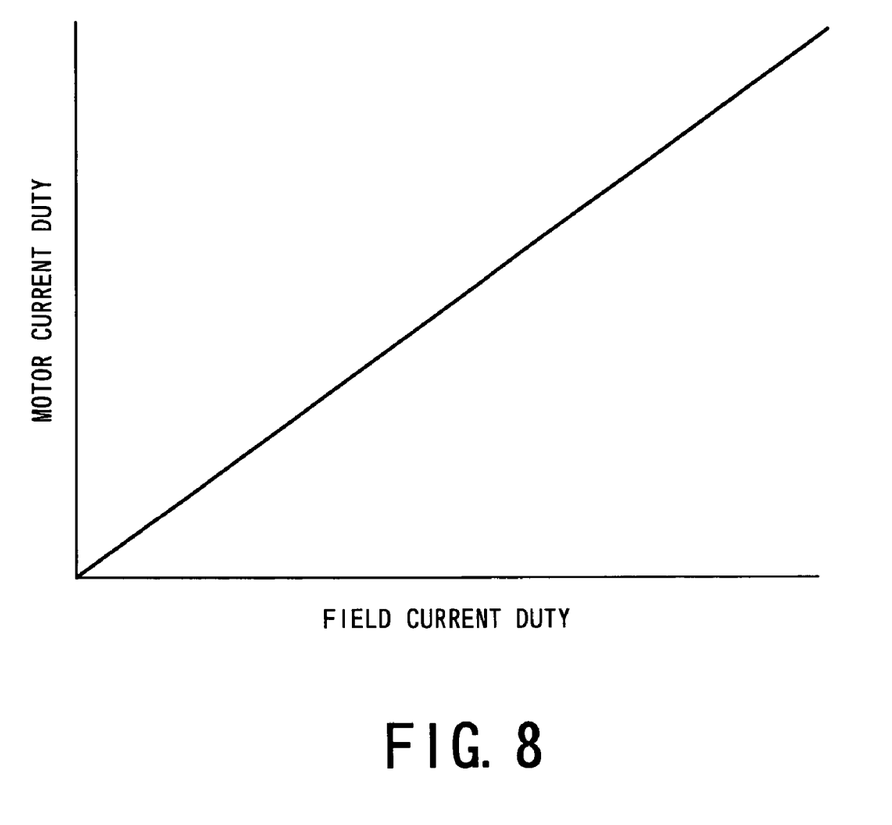
FIG. 8 is a graph showing current control for the fan motor incorporated in the generator in the third embodiment.

Referring to FIGS. 6 to 8, a third embodiment of the rotary electric apparatus according to the present invention will now be described.

The alternator 1 according to the third embodiment adopts a configuration in which, as illustrated in FIG. 6, the semiconductor devices of the main rotary unit 2, including the rectifying circuit 4 and the regulator 3, are incorporated in a case 7 different from the armature windings 25 and the semiconductor devices are cooled down by the fan motor 5.

In addition, the current control element 56 is placed such that, as shown in FIG. 7, a base driving signal to the switching transistor 31, which controls the current through the field winding 24, is also supplied to the base of the current control element 56, which is responsible for controlling the current of the fan motor 5. In consequence, as shown in FIG. 8, a one-to-one correspondence is made between a field current duty and a fan motor current duty.

In the main rotary unit 2 based on the above configuration, the thermally-sensitive semiconductor devices including the rectifying circuit 4 and regulator 3 can be thermally separated from the armature windings 25, which are major heating objects. This separation is helpful in enhancing the cooling performance of the fan motor 5, and the cooling can be done more effectively. In contrast, the heat that the armature windings 25 themselves receive from the rectifying circuit 4 becomes less and air holes to the field rotor 23 itself can be made larger.

It is therefore easy to enhance the cooling performance, which leads to providing the compact, space-saving rotary electric apparatus equipped with the air cooling mechanism. Further, the fan motor 5 is driven corresponding to the field current to control power to be generated, the power is prevented from being wasted. As a result, as long as the same amount (relative amount) of heat dissipation (i.e., an amount of cooling) is allowed between the conventional apparatus and the apparatus according the present embodiment, the apparatus according to the present embodiment can be produced as a more compact, more space-saving one as a whole.

(Modifications)

There can be provided a variety of modifications of the foregoing embodiments.

The foregoing embodiments employ the fan motor 5 in which the resin-made casing 60 which not only covers the rectifying circuit 4 but also serves the rear cover. This structure can be modified such that the casing 60 also functions as a ventilating duct through which cooling air is taken in directly from outside the vehicle or the engine room. This is able to further enhance the cooling effect and the problem that external water, dusts, and pebbles are sucked into the fan motor 5 can be prevented, thus raising reliability of the rotary electric apparatus 1.

As to the armature windings 25, there is provided a modification in which the armature windings 25 may be wound in dual-star-type dual slots, i.e., a plurality of sets of three-phase windings, not limited to a single set of three-phase windings.

As to the armature cooling fan 16 in FIG. 4, there is also a modification in which, though the armature cooling fan 16 is not an electric fan, the fan 16 can be replaced by an electric fan to be powered by the armature itself.

The foregoing embodiments have been explained such that the armature windings 25 of the main rotary unit 2 are different in the number of poles from the armature windings 52 of the fan motor 5, but this is not a definite example. The number of poles can be the same between the armature windings 25 and 52, provided that the poles of the fan motor 5 may be multiple poles and the number of revolutions of the fan motor 5 is less than that of the filed rotor 23. In such a configuration, it is necessary to design the fan motor 5 such that the fan motor 5 is made so larger in size that a sufficient cooling performance is realized even in a lower revolution speed range.

In the foregoing embodiments, the AC excitation power to the fan motor 5 is taken from all the three phases of the armature windings 25. However, any two phases of the three-phase armature windings 25 may be applied to the fan motor 5.

Although the fan motor 5 in the respective foregoing embodiments has been composed of an induction motor, this is not limited to such a configuration. For example, the fan motor 5 may be an induction synchronizing motor, a synchronizing motor with damper windings, a reactance motor that acquires a tracking torque by generating eddy current on the magnetic pole surfaces.

Furthermore, the main rotary unit 2 in the foregoing embodiments is not limited to the AC generator, but the main rotary unit 2 may be an electric motor or a rotary apparatus serving both as a motor and a generator. In this configuration, the main rotary unit 2 can be used as a power assistance apparatus for the engine or a starter for the engine.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A rotary electric apparatus, comprising:
   a rotary unit provided with a rotor and an armature disposed as a stator around the rotor, the armature comprising an armature winding generating an AC (alternating current) current when the rotor is driven to rotate;

a semiconductor-type power converter electrically connected to the armature winding of the armature of the rotary unit and equipped in the rotary unit; and a fan motor electrically connected, in parallel with the power converter, to the armature winding of the armature of the rotary unit so as to receive the AC (alternating current) current and driven to cool down the power converter in response to excitation by AC (alternating current) current from the armature winding of the armature.

2. The rotary electric apparatus according to claim 1, wherein the power converter is a semiconductor-type rectifier rectifying, to a DC (direct current), the AC (alternating current) current coming from the armature winding of the armature of the rotary unit and the fan motor comprises an armature winding and the armature winding of the armature of the rotary unit is electrically connected to the armature winding of the fan motor via an elastically supported contact at which both electrical paths coming from both the armature windings of the armature of the rotary unit and the fan motor establish contact with each other.

3. The rotary electric apparatus according to claim 2, wherein the armature winding of the armature of the rotary unit is larger in the number of magnetic poles than the armature winding of the fan motor.

4. The rotary electric apparatus according to claim 3, wherein the number of revolutions of the fan motor is asynchronous, at least in part, with the number of revolutions of the rotary unit.

5. The rotary electric apparatus according to claim 2, wherein the power converter comprises a radiator and the fan motor is disposed close to the radiator of the semiconductor power converter and is connected to a fin unit substantially covering an overall surface of the radiator.

6. The rotary electric apparatus according to claim 2, wherein the fan motor is provided with a resin-made casing also serving as a cover containing the power converter therein.

7. The rotary electric apparatus according to claim 6, wherein the casing is integrated with a ventilating duct opening toward the fan motor.

8. The rotary electric apparatus according to claim 6, comprising a current control element placed between the armature winding of the rotary unit and the armature winding of the fan motor and means for controlling current passing through the current control element so as to control an amount of the AC excitation to the fan motor.

9. The rotary electric apparatus according to claim 8, wherein the controlling means comprises a three-phase bridge rectifier consisting of diodes and a current control circuit including the current control element connected to both positive and negative terminals of the three-phase bridge rectifier.

10. The rotary electric apparatus according to claim 6, wherein the armature of the rotary unit and the power converter are contained in different cases respectively and the fan motor is secured to the case in which the power converter is contained.

11. The rotary electric apparatus according to claim 1, wherein the fan motor is provided with a resin-made casing serving as a cover containing the semiconductor power converter therein.

12. The rotary electric apparatus according to claim 11, wherein the fan motor comprises an armature winding and the armature winding of the armature of the rotary unit is electrically connected to the armature winding of the fan motor via an elastically supported contact portion at which both electrical paths coming from both the armature windings of the armature of the rotary unit and the fan motor establish contact with each other.

13. The rotary electric apparatus according to claim 11, wherein the casing is integrated with a ventilating duct opening toward the fan motor.

14. A rotary electric apparatus, comprising:

a rotary unit provided with a rotor and an armature disposed as a stator around the rotor, the armature comprising an armature winding generating an AC (alternating current) current when the rotor is driven to rotate;

a semiconductor device electrically connected to the armature winding of the armature of the rotary unit and equipped in the rotary unit; and a fan motor electrically connected, in parallel with the power converter, to the armature winding of the armature of the rotary unit so as to receive the AC (alternating current) and driven to cool down the semiconductor device in response to the excitation by the AC (alternating current) current from the armature winding of the armature.

15. The rotary electric apparatus according to claim 14, wherein the rotary unit is formed as a three-phase type of rotary unit having, as the armature winding, three-phase armature windings, the semiconductor device is a semiconductor-type three-phase rectifier rectifying three-phase currents induced by the three-phase armature windings, and the fan motor is provided with a resin-made casing serving as a cover containing the rectifier therein.

16. The rotary electric apparatus according to claim 15, wherein the fan motor comprises an armature winding and the armature winding of the armature of the rotary unit is electrically connected to the armature winding of the fan motor via an elastically supported contact at which both electrical paths coming from both the armature windings of the armature of the rotary unit and the fan motor establish contact with each other.

17. The rotary electric apparatus according to claim 15, wherein the casing is integrated with a ventilating duct opening toward the fan motor.

* * * * *